(12) United States Patent
Hsu et al.

(10) Patent No.: US 6,707,222 B2
(45) Date of Patent: Mar. 16, 2004

(54) MOTOR STATOR USING CORNER SCRAPS FOR ADDITIONAL ELECTRICAL COMPONENTS

(75) Inventors: John S. Hsu, Oak Ridge, TN (US); Gui-Jia Su, Knoxville, TN (US); Donald J. Adams, Knoxville, TN (US); James M. Nagashima, Cerritos, CA (US); Constantin Stancu, Anaheim, CA (US); Douglas S. Carlson, Hawthorne, CA (US); Gregory S. Smith, Woodland Hills, CA (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/189,953

(22) Filed: Jul. 3, 2002

(65) Prior Publication Data

US 2004/0004410 A1 Jan. 8, 2004

(51) Int. Cl.⁷ ................................................. H02K 1/12
(52) U.S. Cl. ....................................................... 310/254
(58) Field of Search ................................ 310/254, 216, 310/217, 218

(56) References Cited

U.S. PATENT DOCUMENTS

| | | | |
|---|---|---|---|
| 4,949,023 A | * | 8/1990 | Shlien .......................... 318/541 |
| 5,027,264 A | | 6/1991 | DeDoncker et al. |
| 6,313,557 B1 | * | 11/2001 | De Filippis et al. ......... 310/216 |
| 6,380,655 B1 | * | 4/2002 | Ide et al. ..................... 310/211 |

OTHER PUBLICATIONS

M.H.K. Wang, et al, "Bi–directional dc to dc converters for fuel cell systems," in Conf. Rec. 1998 *IEEE Power Electronics in Transportation*, pp. 47–51.

H.Li, Fang Z. Peng and J. Lawler, "Modeling, simulation, and experimental verification of soft–switched bi–directional DC–DC converters," IEEE APEC proceeding, 2001, pp. 736–742.

* cited by examiner

*Primary Examiner*—Nguyen N Hanh
(74) *Attorney, Agent, or Firm*—Quarles & Brady LLP

(57) ABSTRACT

A method for making a motor and auxiliary devices with a unified stator body comprises providing a piece of material (10) having an area larger than a cross section of the stator (11), removing material from the piece of material (10) to form a pattern for a cross section of a core (11) for the stator, and removing material from the piece of material (10) outside the cross section of the core of the stator (11) to allow positioning of cores (22, 23, 24) for supporting windings (25, 26, 27) of least one additional electromagnetic device, such as a transformer (62) in a dc-to-dc converter (61, 62) that provides a low. voltage dc output. An article of manufacture made according to the invention is also disclosed and apparatus made with the method and article of manufacture are also disclosed.

8 Claims, 4 Drawing Sheets

MOTOR STATOR USING CORNER SCRAPS FOR ADDITIONAL ELECTRICAL COMPONENTS

STATEMENT REGARDING FEDERALLY SPONSORED RESEARCH

This invention was made with assistance under Contract No. DE-AC05-00OR22725 with the U.S. Department of Energy. The Government has certain rights in this invention.

BACKGROUND OF THE INVENTION

The field of the invention is motors, and in particular examples described herein, motors of a type operated under PWM inverter motor control, including induction motors, brushless dc motors, and synchronous ac motors.

A motor can be excited in an ac induction mode, ac synchronous mode, or brushless dc (BLDC) mode using a dc link inverter to control three-phase switching of current in the windings of a 3-phase motor.

The increasingly sophisticated application of the contemporary technology often calls for several electromagnetic devices to be used simultaneously. For example, when an electric motor drive is used in a remote situation, various associated devices such as the auxiliary power systems, filters, transformers, and chokes may also be required. This creates an opportunity for cost reduction by forming multiple devices from individual components.

SUMMARY OF THE INVENTION

The present invention provides a method, an article of manufacture and an apparatus which utilizes corner scraps of stator lamination pieces of a motor to form magnetic cores for additional electromagnetic devices. Such devices can include, but are not limited to, DC-DC converters, transformers, filter chokes, AC output power supplies, and smoothing filters for the main stator windings in PWM applications. The corner cores are used for the magnetic cores of these associated devices.

The flux paths and the flux frequencies in the corner material of the present invention are different from those used in the conventional stators, such as the square stator lamination punching of a washing-machine motor. The stator portion of the punching of a washing-machine motor carries only the fundamental-frequency rotating flux. The corner cores of this invention share magnetic paths with the stator back iron.

In the present invention at least one auxiliary component can be added in each corner of the stator, and the auxiliary devices can be either single-phase or multiple phase components.

The invention maintains the original motor core length.

The invention may be applied to induction motors, brushless dc motors, wound-field synchronous motors and permanent-magnet (PM) motors.

The invention may be practiced with 2-phase modulation which lowers the switching losses of the main inverter.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION OF THE PREFERRED EMBODIMENTS

Figure 1:
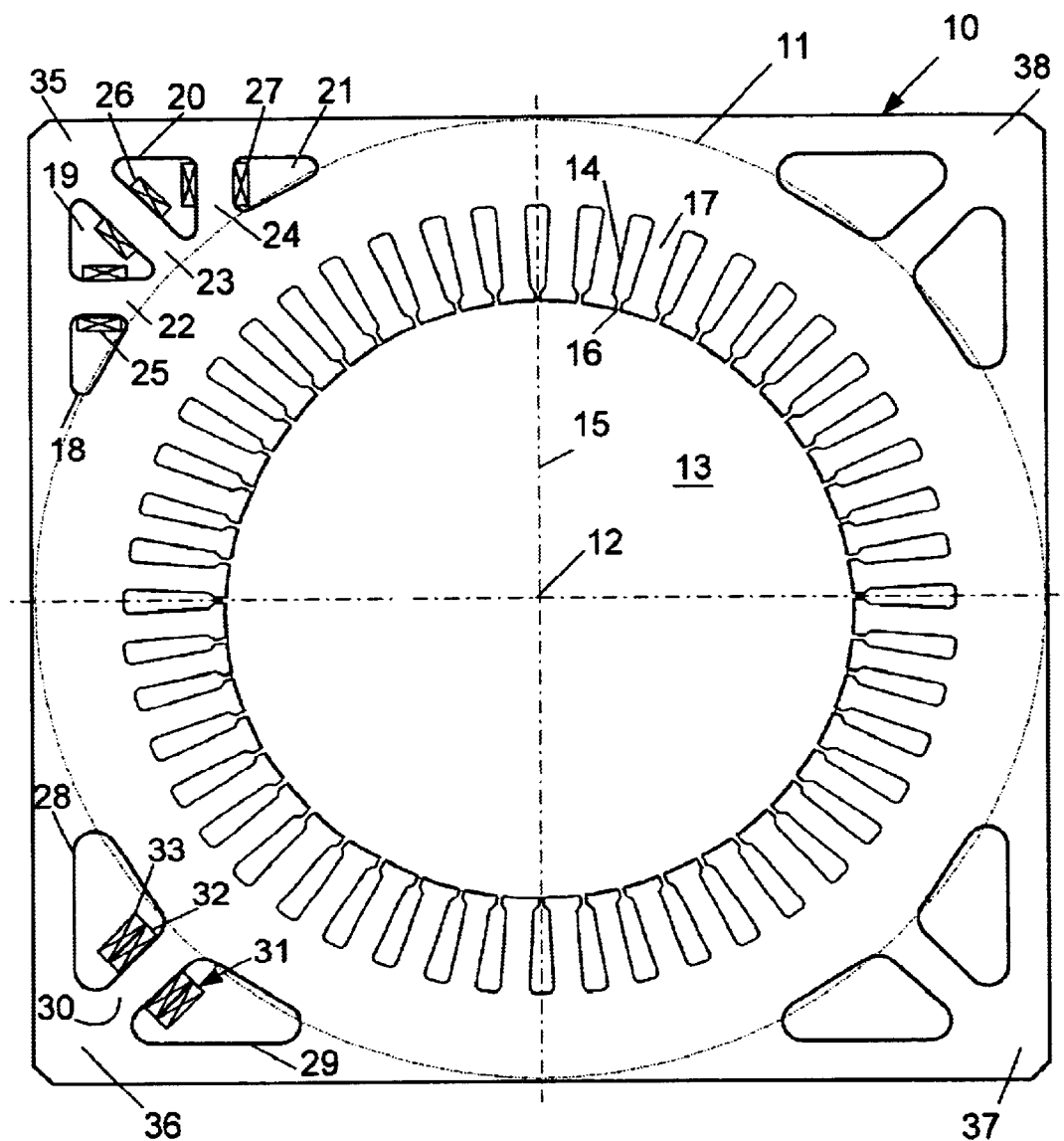
FIG. 1 is a plan view of a first embodiment of a stator lamination punching with additional apertures cut out of each of the four sections.

Referring to FIG. 1, the present invention is practiced in a method for making a stator lamination 10. The stator lamination 10 in this embodiment is square, but in other embodiments it could be rectangular or another non-rectangular shape. Within the square is a circular section 11 defined by a stator radius 15 that originates at a geometric center 12 of the lamination 10. A large central opening 13 is formed in the lamination 10 by cutting out a circular portion. The stator portion 11 of the lamination has slots 14 punched along radii 15 from the center 12 and opening into the central opening 13 through narrow slits 16 separating tooth pieces 17. Stator windings (not shown) would be positioned in the slots 14 according to a winding pattern.

FIG. 1 shows an example of using corner scraps of a stator punching to form cores for auxiliary devices. In the upper left corner, four pieces are cut out of the lamination 10 to form four apertures 18, 19, 20 and 21. The legs 22, 23 and 24 formed between the apertures 18, 19, 20 and 21 are used as cores for the auxiliary devices. Windings 25, 26 and 27 are positioned around the cores 22, 23 and 24. The three windings may be used in three single-phase devices, or in two-phase or three-phase devices.

In the lower left hand corner, as well as the other two corners, two pieces are cut out to form two apertures 28, 29 and a single leg or core 30. A transformer coil 31 with a primary coil 33 overlapping a secondary coil 32 is positioned around the leg 30. Similarly, the windings 25, 26 and 27 may be double windings with a primary winding overlapping a secondary winding, but due to considerations of space and clarity only one of the windings is shown in the upper corner 35 in FIG. 1. However, if the corner device is a choke, a secondary winding is not required. The device in the lower left corner 36 is an example of a single phase device, whereas the upper corner provides cores for a three-phase device. The number of legs and the flux pattern in each corner section 35, 36, 37 and 38 may be varied to obtain the functions of the desired auxiliary devices.

Figure 2:
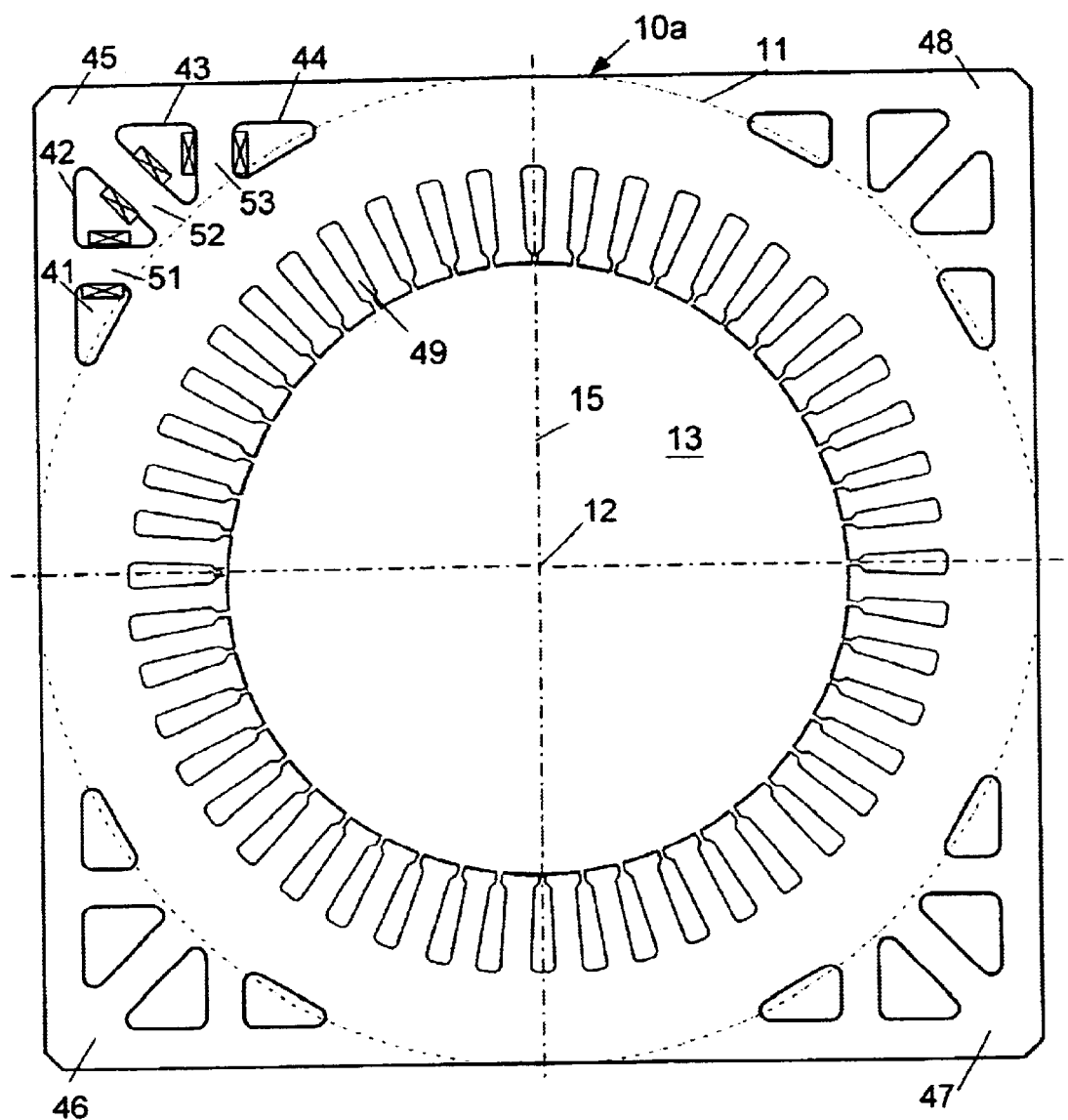
FIG. 2 is a plan view of a second embodiment stator lamination punching with four portions cut out of each of the four corner sections.

FIG. 2 shows another example of a stator lamination 40 using corner punchings in a stator punching to provide a 3-leg shell-type pattern 41, 42, 43, 44 for all corners 45, 46, 47 and 48. Because the stator slots 49 are occupied solely by the original motor windings and the stator back iron (or yoke) magnetic path is only partially shared with the corner cores 51, 52, 53, the length of the stator core can be maintained as that of the original motor.

As an example of the utilization of the corner cores for the associated devices and the differences from those of a conventional square punching, an auxiliary power system that operates simultaneously with the motor under independent control is illustrated as follows.

Figure 3:
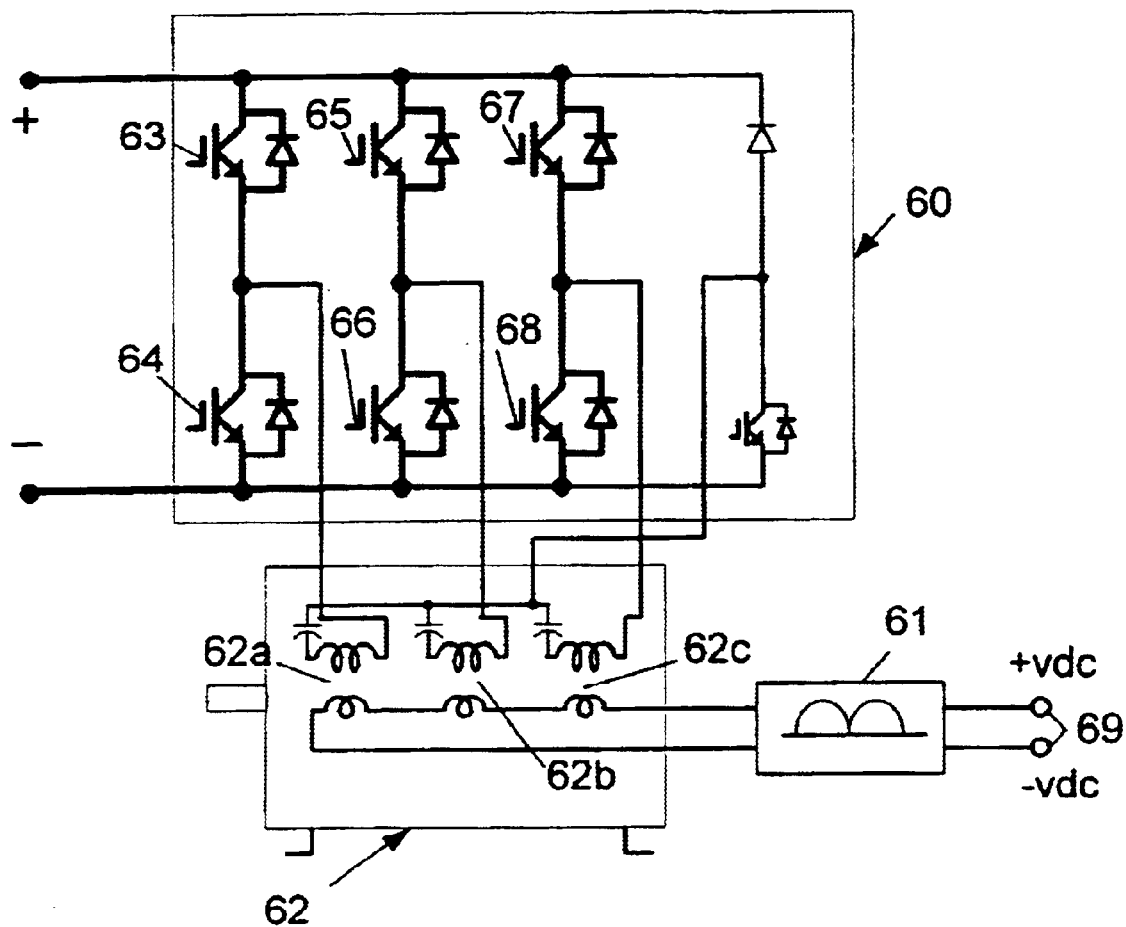
FIG. 3 is an electrical schematic diagram of a motor, an inverter and an auxiliary power system constructed with the stator lamination punching of FIG. 1.

FIG. 3 shows an example of a motor control circuit having an inverter 60 and a dc-to-dc low voltage output power converter 61, 62. For an auxiliary power device there are three basic functions. In order to convert energy from a dc voltage source to a different-voltage auxiliary dc power, there must be a switching function that changes dc to ac, a transformer function that steps down or steps up the ac voltage, and a rectifier function that converts ac to dc. The power switching devices 63, 64, 65, 66, 67, 68 of the three legs of the main inverter 60 produce adjustable currents in the motor main windings (not shown) as well as the controllable zero-sequence-switching currents in the three transformers 62a, 62b, 62c for the auxiliary converter 62 for a different-voltage power output at output terminals 69. Only one power-switching device (such as an IGBT) for each auxiliary voltage output 69 is required in this arrangement. This is because the circuit utilizes the zero-sequence switching of the switching devices 63–68 of the main inverter. The functions of the three transformers 62a, 62b, 62c in the converter 62 can be provided by the corner cores seen in FIGS. 1 and 2. The transformers 62a, 62b, 62c provide for stepping up, or in this case, stepping down of the ac voltage of the zero-sequence switching currents. These voltages are then rectified by the rectifier 61.

Figure 4:
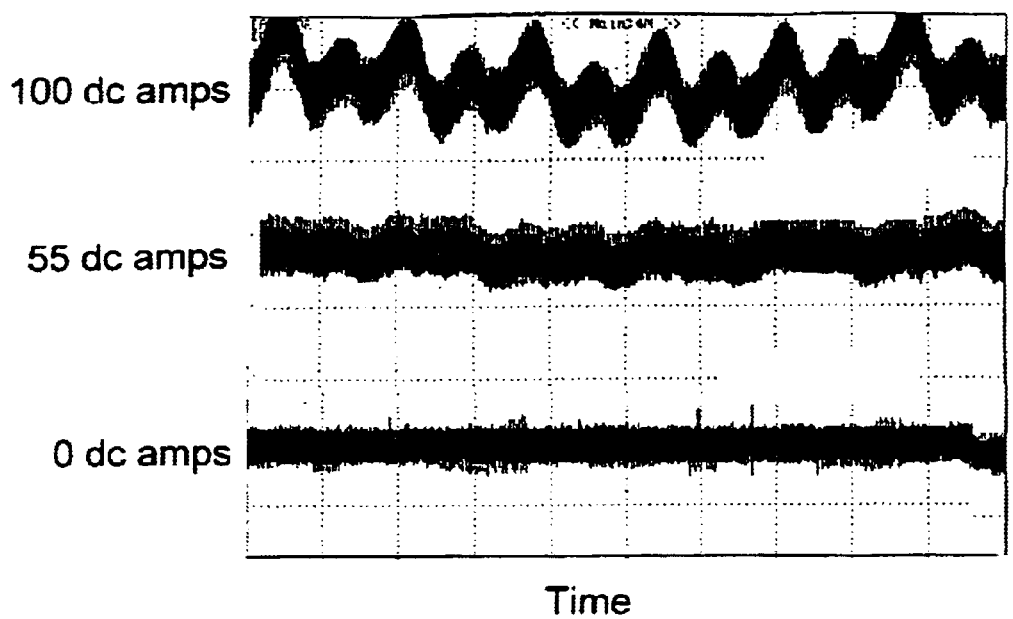
FIG. 4 is a graph of current vs. time for dc charging current waveforms in the apparatus of FIG. 3 for a 2-phase modulation.

FIG. 4 shows the dc charging current waveforms of the system shown in FIG. 3 at 100, 55, and 0 Ampere, respectively, under a full 2-phase modulation.

Figure 5:
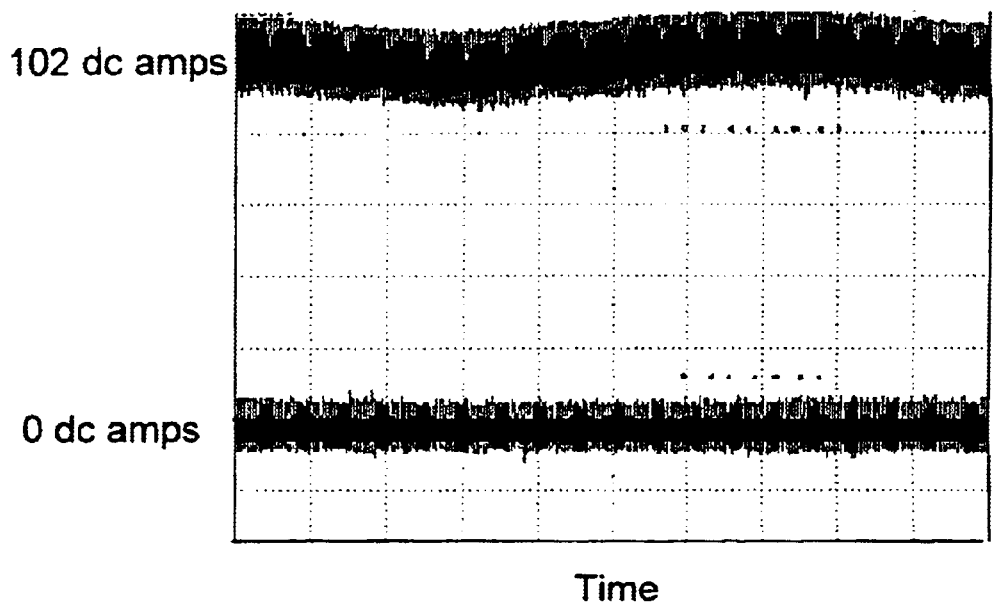
FIG. 5 is a graph of current vs. time for dc charging current waveforms in the apparatus of FIG. 3 for a 3-phase modulation.

FIG. 5 shows the dc charging current waveforms of the circuit shown in FIG. 3 at 102 and 0 Ampere, respectively, under a conventional 3-phase modulation. The two-phase modulation of FIG. 4 lowers the switching losses in the inverter 10, but may provide less than a 100% duty cycle.

It can be seen from this example that the flux paths and the flux frequencies in the corner cores of this invention are different from those used in a conventional motor, such as the square stator punching of a washing-machine motor. The latter punching carries only the fundamental-frequency rotating flux.

There are many other examples of electromagnetic devices that may use the corner cores of the present invention, including but not limited to dc-to-dc converters, transformers, filter chokes, ac output power supplies, and smoothing filters for the main stator windings in PWM applications.

In the method of the present invention a piece of ferromagnetic sheet material 10 is provided with an area that is larger in cross section than the cross section 11 of the stator. Material is removed from the sheet material 10 to form the central opening 13 and the slots 14 to form the stator. Material is also removed from the corner sections 35, 36, 37 and 38 to form the corner apertures 18, 19, 20 and 21 in FIG. 1, for example. Individual pieces of sheet material 10 are assembled to form a stator core and the legs 22, 23 and 24, which will provide cores for an additional electromagnetic device. Coils 25, 26 and 27 are assembled to the legs 22, 23 and 24 to form a 3-phase device of the type seen in FIG. 3. Although windings 25, 26 and 27 are represented only generally, these could include both primary and secondary windings as seen for element 31. In the other corner sections 36, 37 and 38, single phase devices can be formed. FIG. 2 provides an embodiment in which all four corner sections 45, 46, 47 and 48 can accommodate 3-phase devices.

The process preferred for removing pieces is material is punching or stamping, but cutting and other methods may be used. Typically the sheet material 10 is an iron alloy of a type recommended for use in ferromagnetic applications.

Although the description of detailed examples was given on punchings, this invention can be used for the compressed powder cores that are not made of lamination punchings.

In an additional sequence for allowing insertion of the coils into the corner cores, portion(s) of the corner cores 22, 23 and 24 can be removed and the coils 25, 26 and 27 placed around the cores 22, 23 and 24 and the small subassemblies re-assembled with the stator core.

It is also possible to use different materials to form the corner core. For example the removable portion(s) of the corner core can be made of compressed powder of metallic and other particles, which results in a core with ferromagnetic properties, and the main core can be made of punchings.

This has been a description of detailed examples of the invention. It will apparent to those of ordinary skill in the art that certain modifications might be made without departing from the scope of the invention, which is defined by the following claims.

We claim:

1. An electrical motor apparatus comprising:
   a body of ferromagnetic material;
   a stator core for a motor formed in said body of ferromagnetic material, said stator core having a central opening for receiving a rotor, and having slots formed along radii from a center of the body to receive windings and to define stator poles; and
   a plurality of apertures formed in the body of ferromagnetic material to define at least one closed-loop magnetic flux poath around at least one of said apertures for conducting flux to and from the stator core; and
   at least one electromagnetic core for an electromagnetic device being included in the closed-loop magnetic flux path formed by the apertures, said electromagnetic core being formed in a portion of the body lying outside of the stator core.

2. The apparatus of claim 1, wherein the electromagnetic core is a core for a single-phase device.

3. The apparatus of claim 1, wherein the electromagnetic core is a core for a multiple-phase device.

4. The apparatus of claim 1, wherein electromagnetic cores are provided in at least two respective outlying sections, each section providing for a plurality of additional electromagnetic devices.

5. The apparatus of claim 1, wherein the stator core and the electromagnetic core are formed of a plurality of pieces of sheet material laminated together.

6. The apparatus of claim 1, wherein the stator is a stator in a motor of the type operated under PWM control, and wherein the electromagnetic device is an AC step-down transformer.

7. The apparatus of claim 1, wherein the stator is a stator in a motor of the type operated under PWM control, and wherein the electromagnetic device is at least one of: a DC-DC converter, a transformer, a filter choke, an AC output power supply, and a smoothing filter.

8. The apparatus of claim 1, wherein the electromagnetic core for an electromagnetic device is made of a compressed powder material.

* * * * *

UNITED STATES PATENT AND TRADEMARK OFFICE
CERTIFICATE OF CORRECTION

PATENT NO. : 6,707,222 B2  
APPLICATION NO. : 10/189953  
DATED : March 16, 2004  
INVENTOR(S) : Hsu et al.

It is certified that error appears in the above-identified patent and that said Letters Patent is hereby corrected as shown below:

In column 4, claim 1, line 35, "poath" should be --path--.

Signed and Sealed this

Twenty-second Day of May, 2007

JON W. DUDAS  
*Director of the United States Patent and Trademark Office*